(12) United States Patent
Durham et al.

(10) Patent No.: US 9,769,983 B2
(45) Date of Patent: Sep. 26, 2017

(54) LAWN MOWER LIFTING SYSTEM

(71) Applicants: Hugh Durham, Sugar Grove, IL (US); Georgia Durham, Sugar Grove, IL (US)

(72) Inventors: Hugh Durham, Sugar Grove, IL (US); Georgia Durham, Sugar Grove, IL (US)

( * ) Notice: Subject to any disclaimer, the term of this patent is extended or adjusted under 35 U.S.C. 154(b) by 0 days.

(21) Appl. No.: 14/997,616

(22) Filed: Jan. 18, 2016

(65) Prior Publication Data

US 2017/0202139 A1    Jul. 20, 2017

(51) Int. Cl.
*A01D 34/81*    (2006.01)
*A01D 34/74*    (2006.01)
*A01D 101/00*   (2006.01)

(52) U.S. Cl.
CPC ............. *A01D 34/81* (2013.01); *A01D 34/74* (2013.01); *A01D 2101/00* (2013.01)

(58) Field of Classification Search
USPC ....................................................... 280/43.2
See application file for complete search history.

(56) References Cited

U.S. PATENT DOCUMENTS

| 1,852,100 | A | * | 4/1932 | Ballou ...................... A47L 5/34 |
| | | | | 15/354 |
| D154,256 | S | | 6/1949 | Ensign |
| 2,763,116 | A | * | 9/1956 | Flinchbaugh .......... A01D 34/74 |
| | | | | 280/638 |
| 2,792,898 | A | | 5/1957 | Mast |
| 3,112,594 | A | | 12/1963 | Hallenbeck |
| 3,141,283 | A | * | 7/1964 | Swindler ................ A01D 34/63 |
| | | | | 56/17.2 |
| 3,382,653 | A | | 5/1968 | Buigne |
| 3,650,097 | A | * | 3/1972 | Nokes .................. A01B 69/008 |
| | | | | 180/204 |
| 3,952,483 | A | * | 4/1976 | Masterson ............. A01D 34/84 |
| | | | | 56/17.2 |
| 3,992,859 | A | * | 11/1976 | Rubin ...................... A01G 1/12 |
| | | | | 280/43.2 |
| 4,024,695 | A | | 5/1977 | Haseloff |
| 4,598,536 | A | | 7/1986 | Langley |
| 5,653,096 | A | | 8/1997 | Edwards |
| 2003/0140611 | A1 | * | 7/2003 | Burke .................... A01D 34/54 |
| | | | | 56/17.2 |

* cited by examiner

*Primary Examiner* — Alicia Torres

(57) ABSTRACT

A lawn mower lifting system for selectively raising and lowering a lawn mower deck includes a lawn mower that has a deck. A lifting unit is provided and the lifting unit includes a front wheel. The lifting unit is movably coupled to the deck and the front wheel may roll along a support surface. The lifting unit threadably engages the front wheel. Thus, the lifting unit may space the deck a selected distance from the support surface.

7 Claims, 5 Drawing Sheets

LAWN MOWER LIFTING SYSTEM

BACKGROUND OF THE DISCLOSURE

Field of the Disclosure

The disclosure relates to lifting devices and more particularly pertains to a new lifting device for threadably adjusting a height of a lawn mower deck.

SUMMARY OF THE DISCLOSURE

An embodiment of the disclosure meets the needs presented above by generally comprising a lawn mower that has a deck. A lifting unit is provided and the lifting unit includes a front wheel. The lifting unit is movably coupled to the deck and the front wheel may roll along a support surface. The lifting unit threadably engages the front wheel. Thus, the lifting unit may space the deck a selected distance from the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
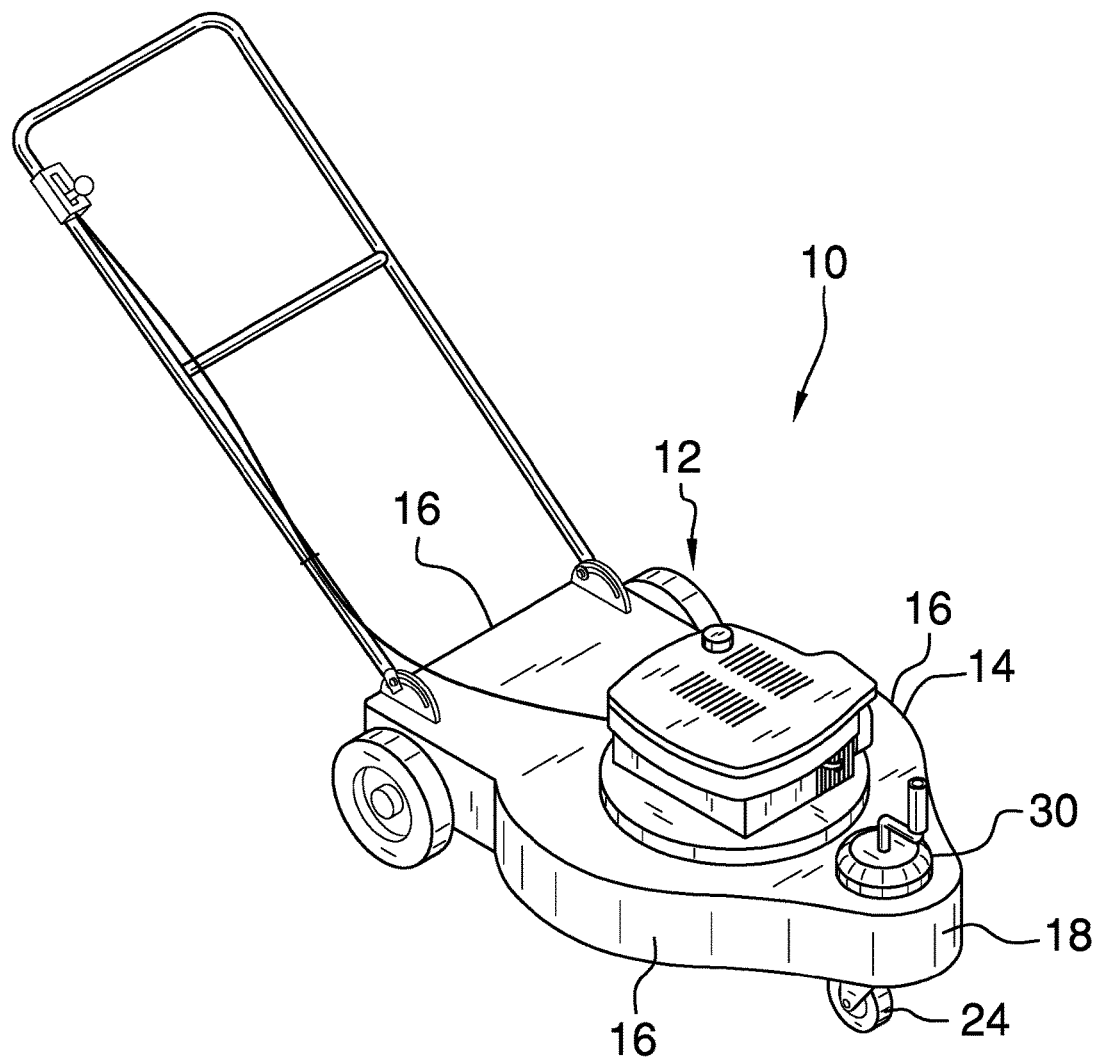
FIG. 1 is a top perspective view of a lawn mower lifting system according to an embodiment of the disclosure.
Figure 2:
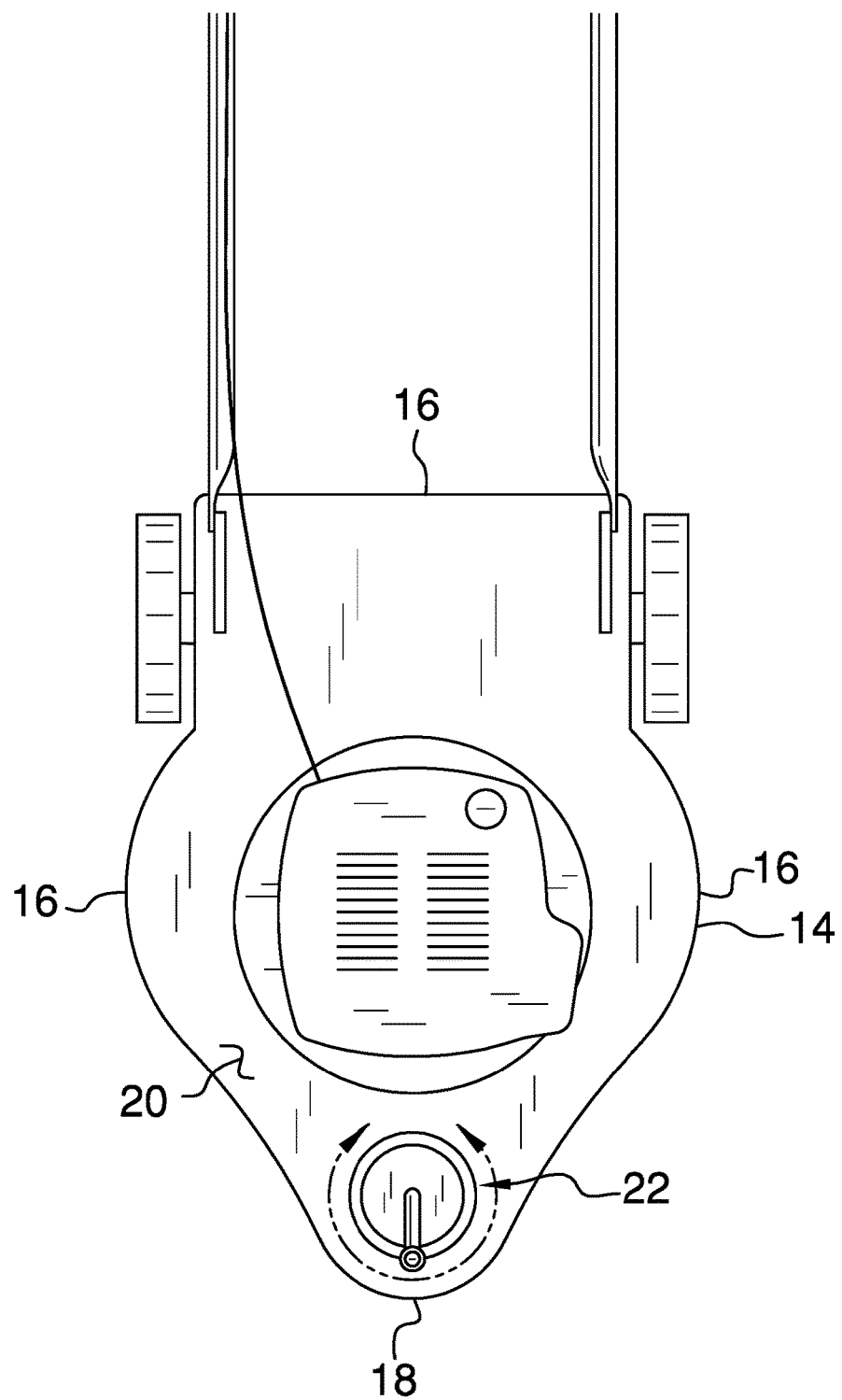
FIG. 2 is a top view of an embodiment of the disclosure.
Figure 3:
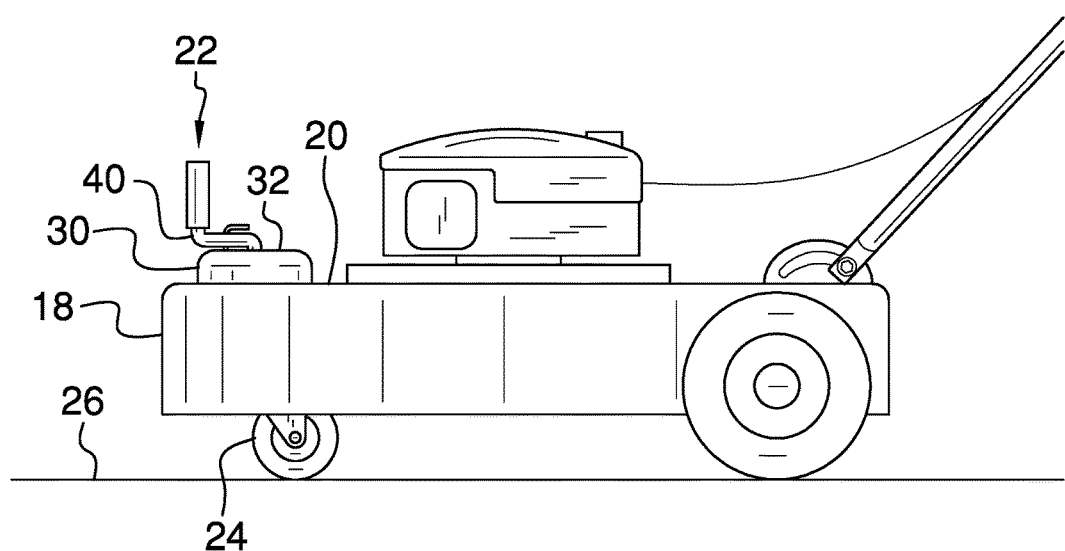
FIG. 3 is a left side view of an embodiment of the disclosure.
Figure 4:
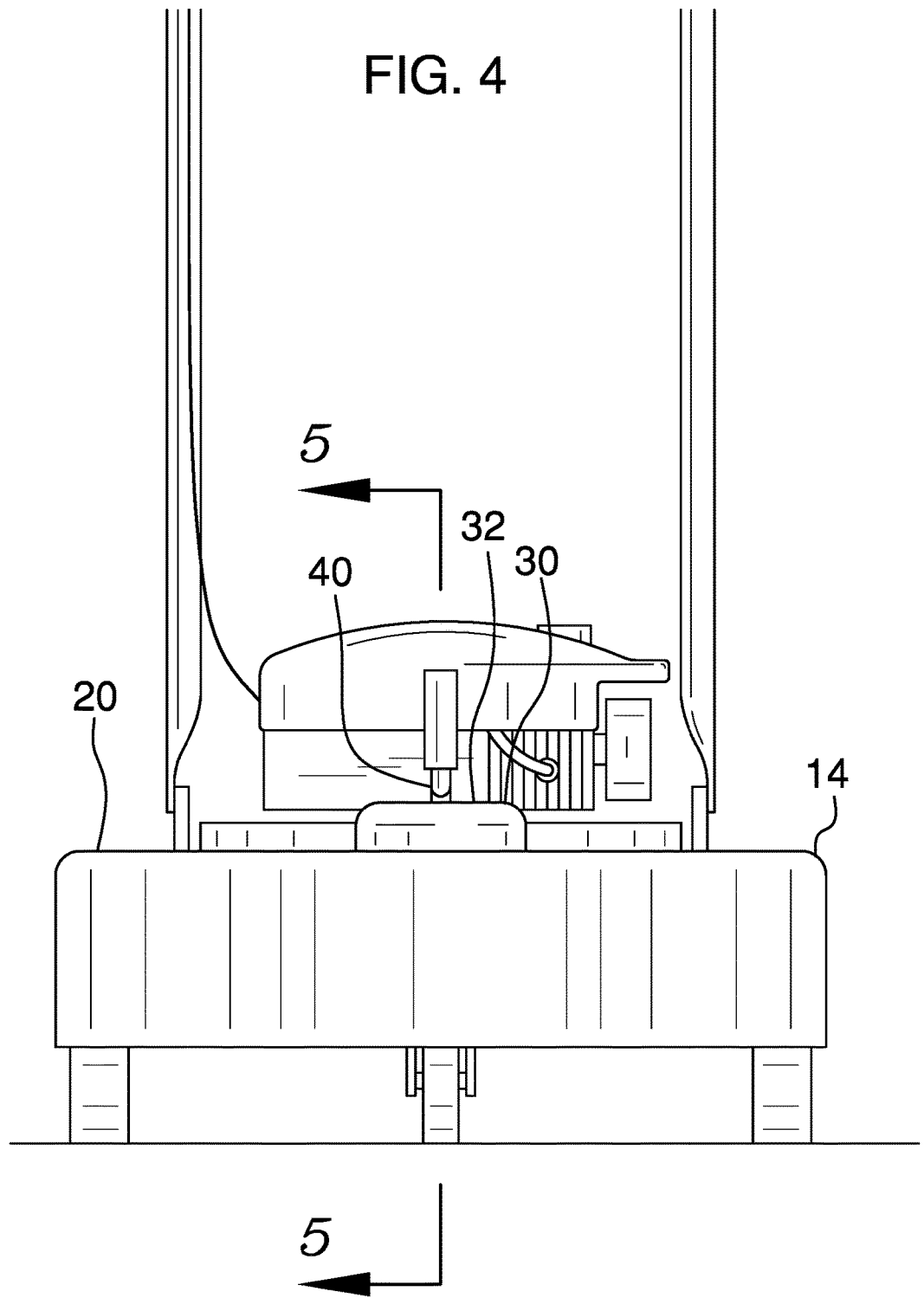
FIG. 4 is a front view of an embodiment of the disclosure.
Figure 5:
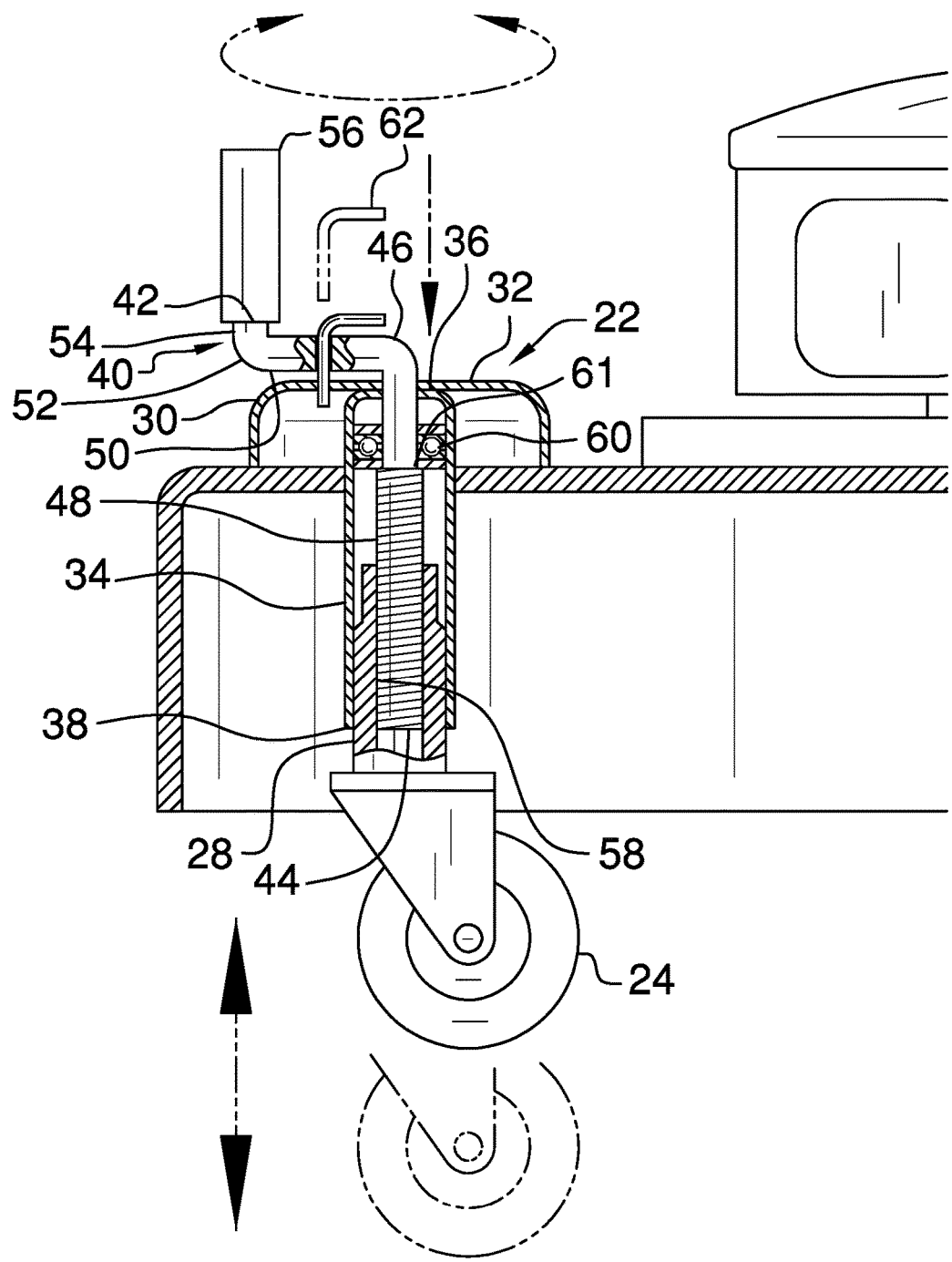
FIG. 5 is a cross sectional view taken along line 5-5 of FIG. 4 of an embodiment of the disclosure.

With reference now to the drawings, and in particular to FIGS. 1 through 5 thereof, a new lifting device embodying the principles and concepts of an embodiment of the disclosure and generally designated by the reference numeral 10 will be described.

As best illustrated in FIGS. 1 through 5, the lawn mower lifting system 10 generally comprises a lawn mower 12 that has a deck 14. The deck 14 has plurality of intersecting peripheral sides 16 such that the deck 14 has a triangular shape. The deck 14 has a front most point 18 and a top surface 20. The lawn mower 12 may comprise a push lawn mower or the like.

A lifting unit 22 is provided and the lifting unit 22 includes a front wheel 24. The front wheel 24 may comprise a caster or the like. The lifting unit 22 is movably coupled to the deck 14 and the front wheel 24 may roll along a support surface 26. The support surface 26 may be ground. The lifting unit 22 threadably engages the front wheel 24. Thus, the lifting unit 22 may space the deck 14 a selected distance from the support surface 26. The front wheel 24 includes a sleeve 28 extending upwardly from the front wheel 24.

The lifting unit 22 comprises a dome 30 that is coupled to the top surface 20 of the deck 14. The dome 30 is positioned adjacent to the front most point 18. The dome 30 has an upper side 32 and the upper side 32 is spaced from the top surface 20. The upper side 32 may be flattened.

A tube 34 is provided that has an upper end 36 and a lower end 38. The lower end 38 is open. The tube 34 extends downwardly through the top surface 20 of the deck 14. The upper end 36 is positioned beneath the dome 30 and the sleeve 28 extends upwardly into the lower end 38.

A crank 40 is provided that has a first end 42 and a second end 44. The crank 40 has a first bend 46 thereon to define a lower portion 48 forming a right angle with respect to a central portion 50. The crank 40 has a second bend 52 positioned between the first bend 46 and the second end 44. The second bend 52 defines an upper portion 54 forming a right angle with respect to the central portion 50. The upper portion 54 is oriented parallel to the lower portion 48 and the upper portion 54 may be manipulated.

A grip 56 is rotatably coupled around the upper portion 54 of the crank 40. The grip 56 may be gripped. Thus, the grip 56 facilitates rotating the crank 40. The lower portion 48 is threaded between the first bend 46 and the second end 44. The lower portion 48 extends downwardly through the upper side 32 of the dome 30 such that central portion 50 is spaced from the upper side 32.

The lower portion 48 extends through the upper end 36 of the tube 34 and the lower portion 48 threadably engages an inner surface 58 of the sleeve 28. The crank 40 is rotatable in a raising direction and a lowering direction. The crank 40 urges the sleeve 28 downwardly along the lower portion 48 when the crank 40 is rotated in the raising direction. Thus, the front wheel 24 raises the deck 14 from the support surface 26. The crank 40 urges the sleeve 28 upwardly along the lower portion 48 when the crank 40 is rotated in the lowering direction. Thus, the front wheel 24 lowers the deck 14 toward the support surface 26.

A bearing 60 is coupled within the tube 34. The bearing 60 is positioned between the top surface 20 of the deck 14 and the upper end 36 of the tube 34. The lower portion 48 of the crank 40 extends through the bearing 60. Thus, the bearing 60 may reduce a rotational friction of the crank 40. A shoulder 61 of the lower portion 48 abuts the bearing 60 thereby inhibiting the crank 40 from sliding upwardly in the bearing 60. The bearing 60 may comprise a ball bearing or the like.

A pin 62 is provided and the pin 62 may be manipulated. The pin 62 selectively extends through the central portion 50 of the crank 40 and engages the upper side 32 of the dome 30. Thus, the pin 62 retains the crank 40 at selected point of rotation. The pin 62 retains the deck 14 at a selected height from the support surface 26. The lifting unit 22 may be retro-fitted onto any existing lawn mower 12.

In use, the crank 40 is manipulated to rotate in the raising direction to raise the deck 14 a selected distance from the support surface 26. The pin 62 is extended through the crank 40 and engages the dome 30 to inhibit the crank 40 from rotating. Thus, the deck 14 is retained at the selected distance from the support surface 26. The pin 62 is removed from the crank 40 and the crank is rotated in the lowering direction. Thus, the deck 14 is lowered to a selected distance from the support surface 26. The pin 62 is extended through the crank 40 and engages the dome 30 to inhibit the crank 40 from rotating. Thus, the deck 14 is retained at the selected distance from the support surface 26. The lawn mower 12 is utilized in the traditional convention of lawn mowers.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A lawn mower lifting system comprising:
    a lawn mower having a deck, said deck having plurality of intersecting peripheral sides such that said deck has a triangular shape, wherein said deck has a top surface and a front most point; and
    a lifting unit including a front wheel, said lifting unit being movably coupled to said deck wherein said front wheel is configured to roll along a support surface, said lifting unit threadably engaging said front wheel, wherein said lifting unit is configured to space said deck a selected distance from the support surface, wherein said lifting unit comprises a dome being coupled to a top surface of said deck, said dome being positioned adjacent to said front most point, said dome having an upper side being spaced from said top surface, said front wheel including a sleeve; and
    a tube having an upper end and a lower end, said lower end being open, said tube extending downwardly through said top surface of said deck such that said upper end is positioned beneath said dome, said sleeve extending upwardly into said lower end.

2. The system according to claim 1, further comprising a crank having a first end and a second end, said crank having a first bend thereon to define a lower portion forming a right angle with respect to a central portion, said crank having a second bend being positioned between said first bend and said first end to define an upper portion forming a right angle with respect to said central portion, said upper portion being oriented parallel to said lower portion, said upper portion being configured to be manipulated, said lower portion being threaded between said first bend and said second end.

3. A lawn mower lifting system comprising:
    a lawn mower having a deck, said deck having plurality of intersecting peripheral sides such that said deck has a triangular shape;
    a lifting unit including a front wheel, said lifting unit being movably coupled to said deck wherein said front wheel is configured to roll along a support surface, said lifting unit threadably engaging said front wheel, wherein said lifting unit is configured to space said deck a selected distance from the support surface;
    a crank having a first end and a second end, said crank having a first bend thereon to define a lower portion forming a right angle with respect to a central portion, said crank having a second bend being positioned between said first bend and said first end to define an upper portion forming a right angle with respect to said central portion, said upper portion being oriented parallel to said lower portion, said upper portion being configured to be manipulated, said lower portion being threaded between said first bend and said second end;
    said front wheel including a sleeve;
    a dome having an upper side;
    a tube having an upper end; and
    said lower portion extending downwardly through said upper side of said dome such that central portion is spaced from said upper side, said lower portion extending through said upper end of said tube, said lower portion threadably engaging an inner surface of said sleeve.

4. The system according to claim 3, wherein said crank is rotatable in a raising direction and a lowering direction, said crank urging said sleeve downwardly along said lower portion when said crank is rotated in said raising direction wherein said front wheel is configured to raise said deck from the support surface, said crank urging said sleeve upwardly along said lower portion when said crank is rotated in said lowering direction wherein said front wheel is configured to lower said deck toward the support surface.

5. The system according to claim 3, further comprising a bearing being coupled within said tube, said bearing being positioned between a top surface of said deck and said upper end of said tube, said lower portion of said crank extending through said bearing, wherein said bearing is configured to reduce a rotational friction of said crank.

6. The system according to claim 3, further comprising a pin being configured to be manipulated, said pin selectively extending through said central portion of said crank and engaging said upper side of said dome such that said pin retains said crank at selected point of rotation wherein said pin is configured to retain the deck at a selected height from the support surface.

7. A lawn mower lifting system comprising:
    a lawn mower having a deck, said deck having plurality of intersecting peripheral sides such that said deck has a triangular shape, said deck having a front most point and a top surface; and
    a lifting unit including a front wheel, said lifting unit being movably coupled to said deck wherein said front wheel is configured to roll along a support surface, said lifting unit threadably engaging said front wheel wherein said lifting unit is configured to space said deck a selected distance from the support surface, said front wheel including a sleeve extending upwardly from said front wheel, said lifting unit comprising:
        a dome being coupled to said top surface of said deck, said dome being positioned adjacent to said front most point, said dome having an upper side being spaced from said top surface,
        a tube having an upper end and a lower end, said lower end being open, said tube extending downwardly through said top surface of said deck having said upper end being positioned beneath said dome, said sleeve extending upwardly into said lower end, a crank having a first end and a second end, said crank having a first bend thereon to define a lower portion forming a right angle with respect to a central portion, said crank having a second bend being positioned between said first bend and said first end to define an upper portion forming a right angle with respect to said central portion, said upper portion being oriented parallel to said lower portion, said upper portion being configured to be manipulated, said lower portion being threaded between said first bend and said second end, said lower portion extending downwardly through said upper side of said dome such that central portion is spaced from said upper side, said lower portion extending through said upper end of said tube, said lower portion threadably engaging an inner surface of said sleeve, said crank being rotatable in a raising direction and a lowering direction, said crank urging said sleeve downwardly along said lower portion when said crank is rotated in said raising direction wherein said front wheel is configured to raise said deck from the support surface, said crank urging said sleeve upwardly along said lower portion when said crank is rotated in said lowering direction wherein said front wheel is configured to lower said deck toward the support surface, a bearing being coupled within said tube, said bearing being positioned between said top surface of said deck and said upper end of said tube, said lower portion of said crank extending through said bearing wherein said bearing is configured to reduce a rotational friction of said crank, and a pin being configured to be manipulated, said pin selectively extending through said central portion of said crank and engaging said upper side of said dome such that said pin retains said crank at selected point of rotation wherein said pin is configured to retain the deck at a selected height from the support surface.

* * * * *